United States Patent
Sturt

(10) Patent No.: US 7,207,616 B2
(45) Date of Patent: Apr. 24, 2007

(54) SLIDING LOAD FLOOR SYSTEM WITH TWO-AXIS PIVOTING HINGE

(75) Inventor: Alan Sturt, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/162,237

(22) Filed: Sep. 2, 2005

(65) Prior Publication Data

US 2007/0052253 A1    Mar. 8, 2007

(51) Int. Cl.
  *B60P 3/34*    (2006.01)
(52) U.S. Cl. .................... 296/26.1; 296/26.09
(58) Field of Classification Search .............. 296/26.1, 296/26.14; 414/522
  See application file for complete search history.

(56) References Cited

U.S. PATENT DOCUMENTS

| | | | | |
|---|---|---|---|---|
| 2,284,419 | A * | 5/1942 | Greig | 296/26.09 |
| 4,023,850 | A | 5/1977 | Tillery | |
| 4,305,695 | A * | 12/1981 | Zachrich | 414/522 |
| 4,531,773 | A | 7/1985 | Smith | |
| 4,681,371 | A * | 7/1987 | Leonard | 296/26.1 |
| 4,752,095 | A * | 6/1988 | Brady | 296/37.6 |
| 5,046,913 | A * | 9/1991 | Domek et al. | 414/522 |
| 5,423,650 | A * | 6/1995 | Zerbst et al. | 414/462 |
| 5,755,480 | A | 5/1998 | Bryan | |
| 5,765,987 | A * | 6/1998 | Zimmermann | 414/800 |
| 5,829,945 | A * | 11/1998 | Stanley | 296/26.09 |
| 5,934,725 | A * | 8/1999 | Bowers | 296/26.09 |
| 6,273,487 | B1 * | 8/2001 | Schurig et al. | 296/37.14 |
| 6,338,518 | B1 | 1/2002 | D Annunzio et al. | |
| 6,516,983 | B2 * | 2/2003 | Sotiroff et al. | 224/281 |
| 6,659,524 | B1 * | 12/2003 | Carlson | 296/26.09 |
| 6,695,380 | B1 * | 2/2004 | Hicks | 296/97.23 |
| 6,779,824 | B1 * | 8/2004 | Lazarevich et al. | 296/50 |
| 6,860,536 | B1 * | 3/2005 | Schimunek | 296/26.09 |
| 2006/0145501 | A1 * | 7/2006 | Warner et al. | 296/37.3 |

* cited by examiner

*Primary Examiner*—Kiran B. Patel
(74) *Attorney, Agent, or Firm*—Brooks Kushman P.C.

(57) ABSTRACT

A sliding load floor system for use in the rear cargo area of a vehicle. The cargo area has a pair of opposing side portions that extend longitudinally in relation to the center line of the vehicle. A pair of opposing transverse portions extend laterally in relation to the vehicle. A storage area is positioned between and at a level below a plane including the side and transverse portions. The sliding load floor system comprises a slide mechanism including a pair of opposing rail members having a forward edge, a frame that is slidably received by the rail members of the slide mechanism, a removable load floor that is detachably positioned in relation to the frame; and a two-axis hinge assembly that is mounted to the side portions. The forward edges of the rail members are connected to the hinge assembly so that the frame and the removable load floor may be displaced in relation to the hinge assembly, and the frame plus the load floor may be slid rearwardly and/or arcuately about the hinge assembly.

11 Claims, 2 Drawing Sheets

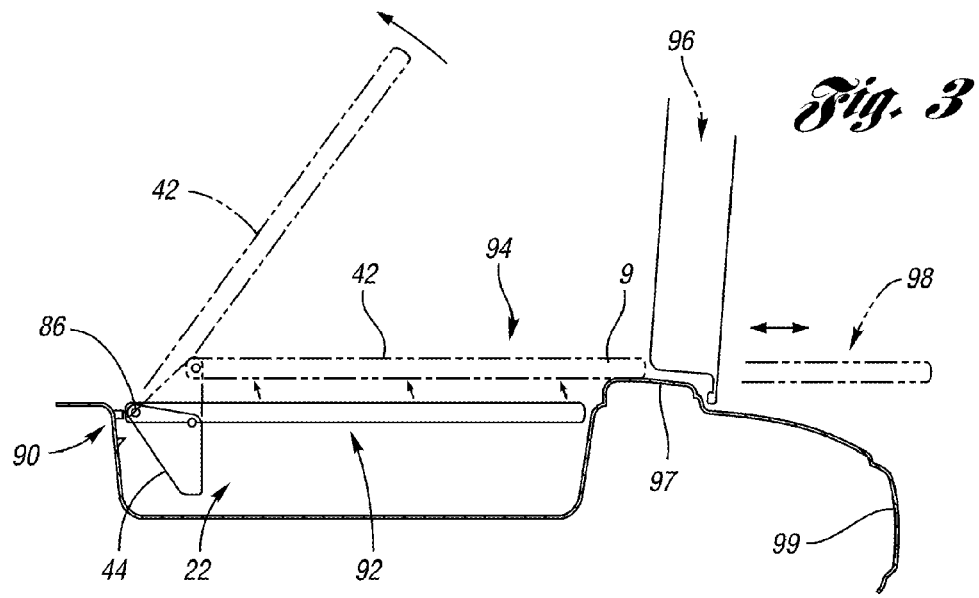
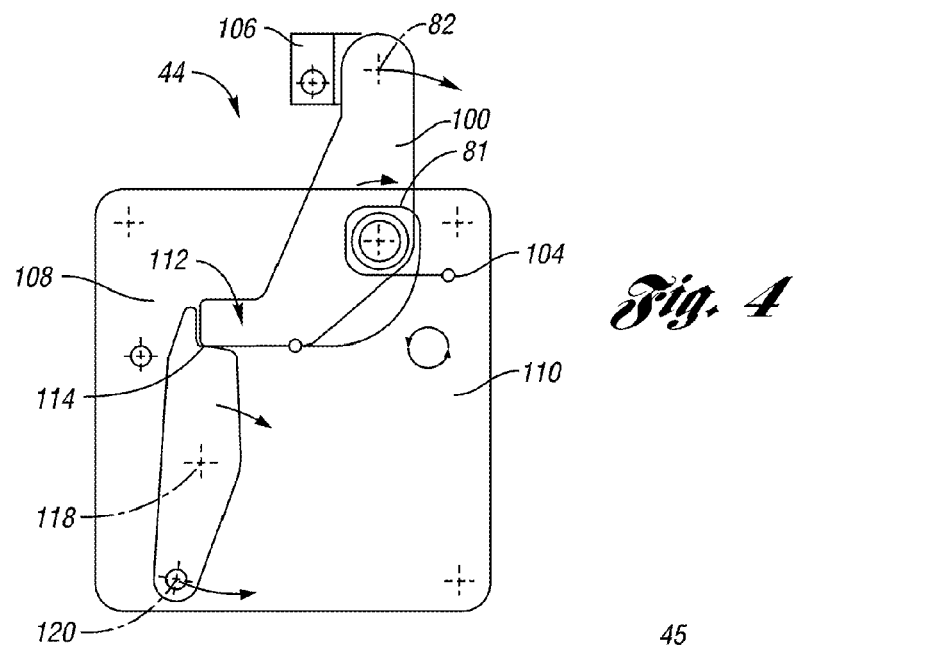
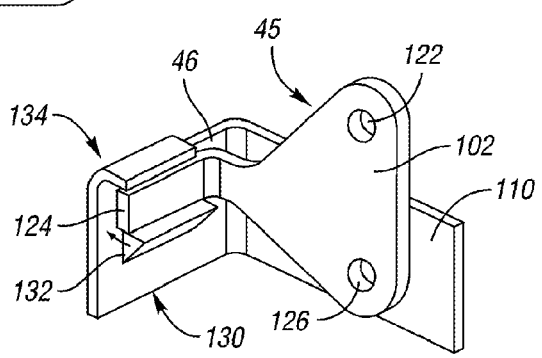

SLIDING LOAD FLOOR SYSTEM WITH TWO-AXIS PIVOTING HINGE

BACKGROUND OF THE INVENTION

1. Field of the Invention

The invention relates to a sliding load floor system for the cargo area of a vehicle to allow ergonomic loading and unloading of heavy cargo.

2. Background Art

Today's roads are traveled by full-size pickup trucks, mid-size, and compact vehicles. Typically, they have relatively short rear cargo areas. Abbreviated length restricts the ability of the vehicle operator who wishes to ergonomically transport longer or heavier items that would otherwise be accommodated by vehicles having a longer bed. Tailgate extension devices offer an extended bed floor area. See, e.g., U.S. Pat. Nos. 4,023,850; 4,531,773; and 5,755,480.

To access the rear cargo area, one must first, for example, raise a tailgate or open the rear doors. To retrieve a heavy package located forwardly in the rear cargo area, one must reach over the rear fascia (or rear bumper) area of the vehicle. This may be inconvenient for cleanliness reasons (e.g., the soiling of clothes from a dirty outside vehicle surface). Further, the act of reaching over to retrieve a heavy object may result in back and other physical injury. Similar considerations apply to the act of placing a heavy load into the cargo area from outside the vehicle. Clearly, it would be desirable to avoid the inconvenience of dirtying one's clothing while reducing the chance of back injury.

SUMMARY OF THE INVENTION

It would be desirable to provide a sliding load floor system that permits heavy cargo items to be loaded and unloaded ergonomically.

It would also be desirable that the sliding load floor be operable generally on a horizontal or near-horizontal plane over a raised sill at the rear of the vehicle.

Relatedly, it would be desirable for the sliding load floor system to lie flush with the cargo floor bed when the sliding load floor is in a retracted position, which may be below the height of the sill.

Conventionally, the rear cargo area of a vehicle includes a pair of opposing side portions or trim panels that extend longitudinally in relation to the length of the vehicle. A transverse portion extends laterally. The cargo area can include a storage bin.

The sliding load floor system disclosed herein includes a slide mechanism. The slide mechanism includes a pair of opposing rail members. Each rail member has a forward edge and a rearward edge. A frame is slidably received by the slide mechanism.

Detachably attached to the frame is a removable load floor. A two-axis hinge assembly is mounted to the side portion of the rear cargo area. The forward edges of the rail members are connected to two-axis the hinge assembly. The forward edges of the rail members can be displaced upwardly in relation to the hinge assembly, thereby elevating a level at which the removable load floor can be slid outwardly in relation to the vehicle. In this way, the slide mechanism, the frame and the removable load floor may be moved upwardly. The frame plus the load floor can then be slid rearwardly to provide a horizontal load unload surface and/or if desired, moved arcuately about the hinge assembly to allow access to the storage bin.

Among the art considered in preparing this patent application are commonly owned U.S. Pat. No. 6,338,518; and WO 0153131 that issued to Mink & Associates Inc.

BRIEF DESCRIPTION OF THE DRAWINGS

FIG. 3 is a side view of a flush-fitting sliding load floor system in a stowed position, and in elevated, partially and completely deployed positions;

FIG. 4 is a side view of one embodiment of a two-axis hinge assembly according to the present invention;

FIG. 5 is an alternate embodiment thereof.

DETAILED DESCRIPTION OF THE PREFERRED EMBODIMENT(S)

One purpose of this invention is to provide a sliding load floor system in the cargo area of a vehicle that permits heavy cargo items to be loaded and unloaded ergonomically, even over a raised sill at the rear of the vehicle.

Figure 1:
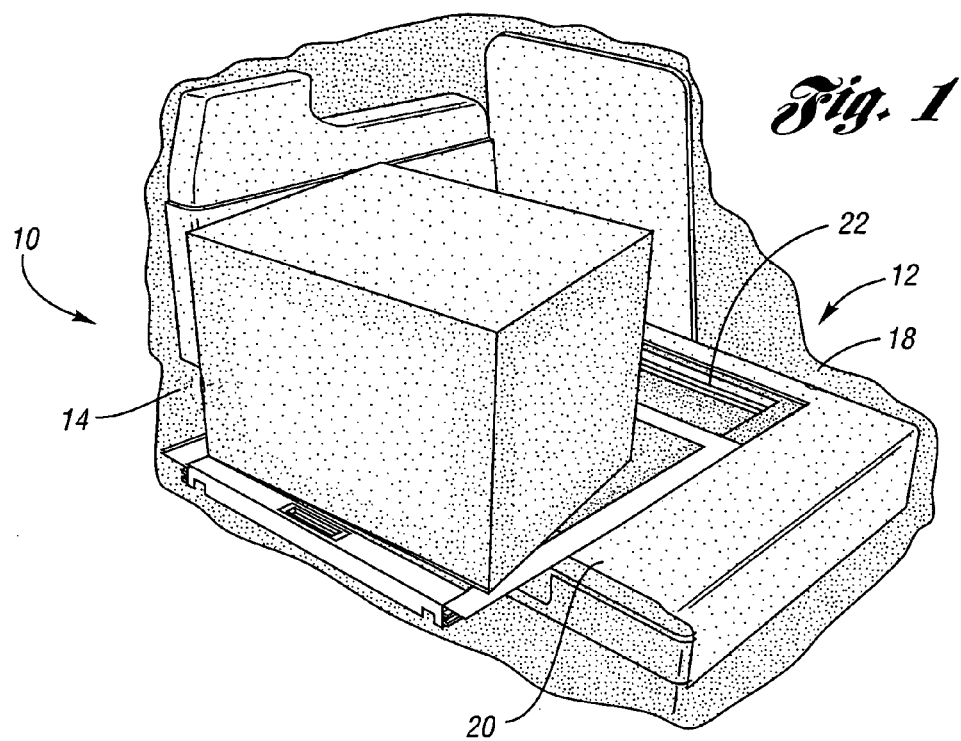
FIG. 1 is a quartering perspective view of a sliding load floor system according to the present invention in an extended position, supporting a load placed thereupon.

In FIG. 1, the rear cargo area 12 includes a pair of opposing side portions or quarter trim panels 14 (one shown) that extend longitudinally in relation to the length of the vehicle, a transverse portion 18 that extends laterally, and a storage bin 22.

The sliding load floor system 10 disclosed herein includes a slide mechanism 24 (FIG. 2), or other linear bearing or linear motion system. The slide mechanism 24 has a pair of opposing rail members 26, 28. Each rail member has a forward edge 30, 32 and a rearward edge 34, 36. A frame 38 is slidably received by the slide mechanism. Preferably, the frame 38 can be removed, if desired, to allow unfettered access to any underlying storage area, so that the storage bin 23 can itself serve as a cargo area. In one embodiment, the slide mechanism 24 includes aluminum extruded rail with cast metal attachment block having nylon liners. Alternatively, the rail members 26, 28 may be formed from rolled steel with steel ball bearings, or equivalent structures. One source for suitable such systems is the Igus Company.

Detachably attached to the frame 38 is a removable load floor 42. Optionally, a mounting bracket 46 may be provided. The mounting bracket 46 allows a fully assembled sliding load floor system to be mounted in the vehicle through holes 84. A hinge assembly is mounted via holes 86 to the side portions of the rear cargo area. The forward edges 30, 32 of the rail members 26, 28 are connected at a pivot axis 82 to the hinge assemblies. In one embodiment, the connection is provided by a pin or bolt, for example, that hingedly connects a forward edge 30, 32 at the pivot axis 82 of an associated hinge assembly 44 (left hand side shown only). Also pivotally connected to the forward edges 30, 32 are associated plates 87. Each plate 87 supports another pivot access 81 (left hand side only shown). Thus, when the plate 87 rotates counterclockwise about pivot access 81, pivot access 82 also moves counterclockwise. Such movement is a resultant of an upward and rearward vector. Correspondingly, the forward edge 30 of the left hand rail member moves upwardly and rearwardly, thereby elevating a forward edge 40 of the frame 38. Similarly, for the right hand side of the sliding load floor assembly. As a result, the sliding load floor lies above the cargo bed.

From the elevated position, the load floor can be deployed rearwardly toward the back of the vehicle across the sill at the rear end of the cargo bed. Such movement generally occurs in a substantially horizontal plane. To accomplish this result, the slide mechanism 24, the frame 38 and the removable load floor 42 are swung upwardly about the forward edges 30, 32 and then rearwardly. Then the frame plus the load floor can be slid further rearwardly, thus allowing loading and unloading.

Preferably, the load floor or panel 42 is a reversible, blow or injection-molded panel that is removably retained within the frame 38. In one embodiment, the floor has a carpeted surface 56 on one side for a continuous floor appearance and a molded floor surface 58 on the other side to serve as a washable surface, and to provide some support for cargo.

FIG. 3 is a side view of the disclosed sliding load floor system 10. In order to clear a rear sill 97, the hinge assembly 44 and the forward end of the load floor rotates upwardly and locks in position when the load floor 42 is extended. The rear end of each slide mechanism outer component 91 rests upon the sill 97 (or a support associated therewith), thus allowing free movement of the load floor 42 in a horizontal plane.

When loaded, the load floor stays in this raised, locked position 94, and the lift gate 96 can be closed. When the load has been removed, a release handle 93 (FIG. 2) located below the floor can be pulled to allow the release mechanism to lower the load floor 42 into the park position when recessed.

FIG. 4 depicts a preferred embodiment of the hinge assembly 44. A forward edge 30 of rail member 26 (FIG. 2) is pivotally attached about pivot axis 82 (FIG. 4) of the pivoting hinge lever 102. The pivot axis 81 is fixed in relation to a mounting bracket 46 (FIG. 2) by a holes 86. Preferably, a helical spring 104 biases the pivoting hinge lever 102 in a counterclockwise direction.

A support plate 110 provides a foundation for the pivot axis 81. The plate 110 also provides a guide for the rotating movement of the pivoting hinge lever 102 during its arcuate travel.

Figure 2:
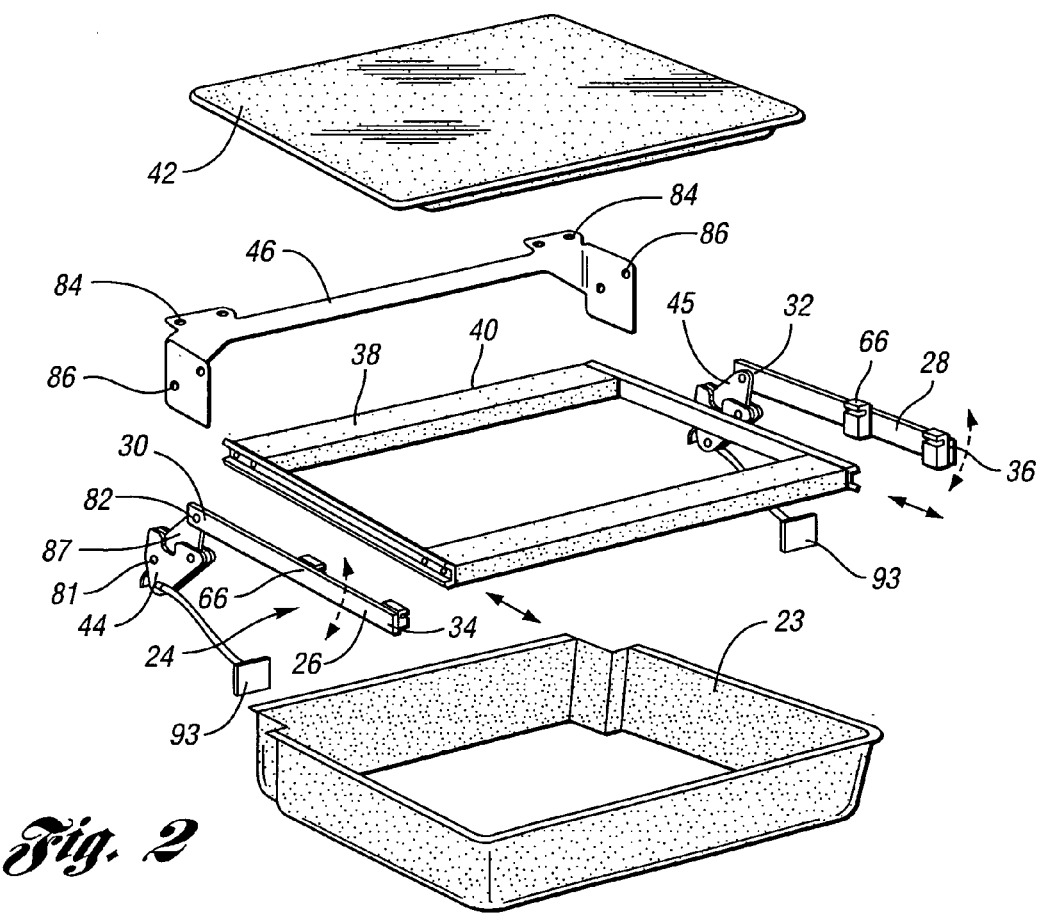
FIG. 2 is an exploded view of one embodiment of the present invention.

When the end 112 of the pivoting hinge lever 102 reaches a limit of clockwise motion by contacting stop block 108, it meets a detent 114 in a locking pawl 116. The pawl 116 may rotate about an axis 118 that is secured by the support plate 110. A leading end 120 of the locking pawl 116 can be displaced by the cable associated with the release handle 93 (FIG. 2). As the pivoting hinge lever 102 rotates clockwise, it displaces the locking pawl 116. As it approaches stop block 108, a biasing spring around pivot 118 urges the locking pawl 116 to rotate clockwise and prevent further movement of pivoting hinge lever 102 until a release handle 93 displaces a cable attached at 120 to rotate locking pawl 116 around pivot 118 thus allowing the pivoting hinge lever to rotate counterclockwise.

Thus, the disclosed mechanism permits the rear edge of the sliding load floor to be lifted, and pulled out to its full extension before being set down. In that position, it is supported that the rear end of the vehicle in a see-saw manner. At least a portion of the mass of the sliding load floor lies outside the vehicle. The floor may be allowed to rotate about a fulcrum defined by the sill in order to achieve its horizontal, upper, elevated level. To release the floor from that position, the cable release activates. It tends to move the leading end 120 of the locking pawl 116 rearwardly in the vehicle. This has the effect of rotating the locking pawl 126 counterclockwise, thereby releasing the pivoting hinge lever 102. That lever may now rotate counterclockwise and allow the sliding load floor 42 to rotate back to its lower elevation, flush with the surrounding floor.

FIG. 5 depicts an alternate form of locking mechanism. In FIG. 5, the pivoting hinge lever 102 is rotatable about pivot access 126 that is in turn supported by plate 110 which extends from the mounting bracket 46. The embodiment illustrated in FIG. 5 illustrates an assembly that may be associated with the right hand edge of the configuration depicted in FIG. 2. Alternatively, it could also depict a possible embodiment associated with the left hand side thereof.

Optionally, the plate 102 (FIG. 5) can be spring-loaded, akin to that depicted in FIG. 4 in connection with pivot axis 81.

A tongue 124 extends from the pivoting hinge lever 102. The tongue 124 is arrested by a stop block 134 when the plate 102 has been rotated clockwise to its full extent. In that position, the load floor 42 (associated with pivot axis 122) is in its deployed (and locked) configuration.

Locking is enabled with the assistance of a spring-loaded latch lock 132 which is activated by the cable mechanism 93 (FIG. 2). Thus, when the cable mechanism is activated, the stop block 132 is moved so that it becomes flush with a face of the mounting bracket 46. This enables the tongue 24 to drop and the plate 102 can rotate in a counterclockwise direction.

This invention thus provides a method for sliding heavy cargo items in and out of a vehicle, while providing a relatively lightweight removable panel that can be moved to a different location.

One advantage of the disclosed system is it provides easy access to sub-floor storage areas while presenting a flush appearance when in the closed position.

Optionally, the load floor system includes a locking feature 66 (FIG. 2) between the frame 38 and the slide mechanism 24 which secures the load floor 42 in fully or partially extended position. Thus, if the vehicle is parked on an incline, deployment of the load floor 42 in an intermediate position tends to avoid unwanted acceleration inwardly toward the vehicle of a heavy load because less inertia (mass×acceleration) will be involved.

Preferably, the disclosed system so configured as to eliminate buzz, squeal, and rattling concerns ("BSR" concerns). In use, the sliding floor may support a load of up to about 440 lbs. (200 kg) when in the fully retracted and extended positions. Maximum deflection is less than about 20 mm, and there is no permanent deformation following repeated use. The effort to fully extend and retract the sliding load floor is less than about 10 kgf when loaded with 440 lbs. (200 kg).

In one embodiment, the entire sliding floor load system weighs less than 9500 grams—including the load floor, the sub-floor storage unit, frame, slide mechanism, and tie down rails.

If desired, the load floor system may be completely removed so as to make the entire sub-floor of the rear cargo area the storage base.

One attribute of the hinged assembly 44 is that it permits the load floor 42 to be able to slide outwardly over a raised sill at the rear of some vehicles while maintaining a generally horizontal orientation.

Preferably, the vehicle should not be driven when the load floor 42 is either partially or fully extended. If desired, a mechanism can be provided whereby an annunciator (located, perhaps on the instrument panel, becomes illuminated if a forward or reverse gear is selected when the load floor is not in its fully retracted position. Additionally or alternatively, such a condition could be communicated via a signal to an actuator that precludes movement of the vehicle until the load floor is slid forwardly and engaged in that position.

Thus, the disclosed system provides a structure (preferably metallic frame 38) that handles load carrying needs. The removable load floor 42 offers the versatility to meet a variety of cargo management demands. The slide mechanism 24 at each side of the system ensures a smooth, low effort movement while extending the load floor of the vehicle. If desired, a storage bin 22 may be provided to handle storage needs below the sliding load floor 42.

Another sliding load floor system is disclosed in U.S. patent application Ser. No. 11/162,237 dated Sep. 2, 2005, entitled "SLIDING LOAD FLOOR SYSTEM WITH TWO-AXIS PIVOTING HINGE" which is filed on the same day as the present application. Another application entitled "SLIDING LOAD FLOOR SYSTEM" disclosing a load floor system was also filed on the date of filing the present application. Its serial number is Ser. No. 11/162,236. Each of these two applications is included herein by reference.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sliding load floor system for use in a rear cargo area of a vehicle, the cargo area having a pair of opposing side portions that extend longitudinally in relation to a center line of the vehicle, and a transverse portion that extends laterally in relation to the vehicle, the sliding load floor system comprising:
    a slide mechanism including a pair of opposing rail members, each rail member having a forward edge;
    a frame that is slidably received by the rail members of the slide mechanism, the frame having a front edge;
    a removable load floor that is detachably positioned in relation to the frame; and
    a hinge assembly having a fixed and a movable pivot axis, the hinge assembly being mounted to the side portions, the forward edges of the rail members being connected to the movable pivot axis of the hinge assembly so that the slide mechanism, the frame and the removable load floor may be displaced about the fixed axis of the hinge assembly, and the frame plus the load floor slid rearwardly in relation to the hinge assembly.

2. The sliding load floor system of claim 1 wherein the forward edges of the rail members can be displaced upwardly in relation to the hinge assembly, thereby elevating them to a level at which the removable load floor can be slid outwardly in relation to the vehicle.

3. The sliding load floor system of claim 1 wherein the fixed pivot axis permits upward displacement of the front edge of each rail member and a movable pivot axis permits the rail members to move arcuately, thereby altering the inclination of the removable load floor.

4. The sliding load floor system of claim 1, further including a locking mechanism associated with the slide mechanism whereby the hinge assembly can be secured at an interim position or a final position, thereby securing the frame and the load floor.

5. The sliding load floor system of claim 1 wherein the hinge assembly includes a pivoting hinge lever that is mounted at each of the side portions of the cargo area.

6. The sliding load floor system of claim 5 wherein one pivoting hinge lever has a fixed pivot axis about which it may move arcuately and a movable pivot axis that is connected to an associated forward edge of a rail member so that as the pivoting hinge lever moves counterclockwise, the associated rail member moves forwardly and when the pivoting hinge lever moves clockwise, the associated forward edge moves rearwardly.

7. The sliding load floor system of claim 6 further including a spring associated with a fixed pivot axis, the spring biasing the pivoting hinge lever in a clockwise direction.

8. The sliding load floor system of claim 6 further including a locking pawl that is mounted at each of the side portions of the cargo area, the locking pawl being rotatable about a pawl axis, the locking pawl having a detent that engages an end of the associated pivoting hinge lever.

9. The sliding load floor mechanism of claim 8 wherein one locking pawl has a leading end that may be displaced by a release mechanism so that the leading edge may move counterclockwise, the detent can be moved counterclockwise, and thus the pivoting hinge lever may move counterclockwise unobstructed by the locking pawl, so that the sliding load floor system may be moved into a recessed, parked position.

10. The sliding load floor system of claim 1 wherein each hinge assembly has a pivoting hinge lever, each pivoting hinge lever having a fixed pivot axis that extends from a support plate, a second pivot axis that may be moved arcuately thereabout, to which a forward edge of a rail member is connected, and a tongue that extends from the pivoting hinge lever;
    a spring-loaded latch block that movably extends from a mounting bracket, the spring-loaded latch block being movable from an extended position in which it engages the tongue, to a recessed position, in which the tongue may be movable downwardly there across.

11. The sliding load floor system of claim 10 wherein the mounting bracket has a stop block which together with the spring-loaded latch block captures the tongue, thereby locking the pivoting hinge lever in a deployed configuration.

* * * * *